(12) United States Patent
Mackin et al.

(10) Patent No.: US 9,980,435 B2
(45) Date of Patent: May 29, 2018

(54) SELF ADJUSTING CONCAVE CLEARANCE SYSTEM

(71) Applicant: Deere & Company, Moline, IL (US)

(72) Inventors: Ryan P Mackin, Milan, IL (US); Glenn E Pope, Viola, IL (US)

(73) Assignee: Deere & Company, Moline, IL (US)

( * ) Notice: Subject to any disclaimer, the term of this patent is extended or adjusted under 35 U.S.C. 154(b) by 219 days.

(21) Appl. No.: 14/529,346

(22) Filed: Oct. 31, 2014

(65) Prior Publication Data

US 2016/0120127 A1    May 5, 2016

(51) Int. Cl.
*A01F 12/28* (2006.01)
*A01D 41/127* (2006.01)

(52) U.S. Cl.
CPC ............ *A01F 12/28* (2013.01); *A01D 41/127* (2013.01)

(58) Field of Classification Search
CPC ...... A01F 12/28; A01F 12/181; A01D 41/127
See application file for complete search history.

(56) References Cited

U.S. PATENT DOCUMENTS

| | | | | |
|---|---|---|---|---|
| 3,552,396 A * | 1/1971 | Gerhardt | ............... | A01F 12/28 460/1 |
| 4,337,611 A * | 7/1982 | Mailander | .......... | A01D 41/1274 460/6 |
| 4,527,241 A * | 7/1985 | Sheehan | ............. | A01D 41/127 56/10.2 R |
| 6,205,384 B1 * | 3/2001 | Diekhans | ............. | A01D 41/127 172/4.5 |
| 6,442,916 B1 * | 9/2002 | Pope | ................... | A01D 41/1271 56/10.2 R |
| 7,001,267 B2 * | 2/2006 | Behnke | ................ | A01D 41/127 460/6 |

(Continued)

FOREIGN PATENT DOCUMENTS

| | | |
|---|---|---|
| EP | 1493318 A1 | 1/2005 |
| EP | 1972190 A1 | 9/2008 |
| WO | 2013082236 A1 | 6/2013 |

OTHER PUBLICATIONS

SensorLand.com, Apr. 23, 2001, www.Sensorland.com/howpage020.html.*

(Continued)

*Primary Examiner* — Alicia Torres
*Assistant Examiner* — Adam J Behrens
(74) *Attorney, Agent, or Firm* — Rathe Lindenbaum LLP

(57) ABSTRACT

An agricultural combine (102) includes a rotor (114), a concave (116), a force sensor (134) to indicate the force applied to a crop mat located between the rotor and the concave, a position sensor (132) to indicate the size of a gap (130) between the rotor (114) and the concave (116), an actuator (122, 124) to position the concave (116) with respect to the rotor (114), and an ECU (144) coupled to the sensors (132, 134) and the actuator (122, 124). The ECU (144) contains an economic operating curve (154, 156, 158) that relates the force to the size of the gap. The ECU (144) is configured to receive a signal from the force sensor (134) and a signal from the position sensor (132), and based upon those signals, to control the actuator (122, 124) to change the force and the size of the gap (130) to a point on the economic operating curve (154, 156, 158).

9 Claims, 3 Drawing Sheets

(56) References Cited

U.S. PATENT DOCUMENTS

| | | | | |
|---|---|---|---|---|
| 7,452,267 B2* | 11/2008 | Bundy | ............... | A01D 75/182 |
| | | | | 460/6 |
| 7,857,690 B2* | 12/2010 | Yanke | ............... | A01F 12/28 |
| | | | | 460/109 |
| 8,118,649 B1* | 2/2012 | Murray | ............... | A01D 75/282 |
| | | | | 460/4 |
| 8,157,629 B2* | 4/2012 | Yanke | ............... | A01F 12/28 |
| | | | | 460/109 |
| 2004/0259610 A1* | 12/2004 | Behnke | ............... | A01D 41/127 |
| | | | | 460/59 |
| 2007/0178951 A1* | 8/2007 | Voss | ............... | A01F 12/28 |
| | | | | 460/109 |
| 2010/0010713 A1* | 1/2010 | Sheidler | ............... | A01D 41/127 |
| | | | | 701/50 |
| 2011/0151951 A1* | 6/2011 | Regier | ............... | A01F 12/181 |
| | | | | 460/109 |
| 2013/0137492 A1* | 5/2013 | Biggerstaff | ............... | A01F 12/28 |
| | | | | 460/62 |
| 2014/0308998 A1* | 10/2014 | Bergkamp | ............... | A01F 12/28 |
| | | | | 460/107 |

OTHER PUBLICATIONS

European Search report in foreign counterpart application 15186584.7 dated Apr. 25, 2016 (5 pages).

* cited by examiner

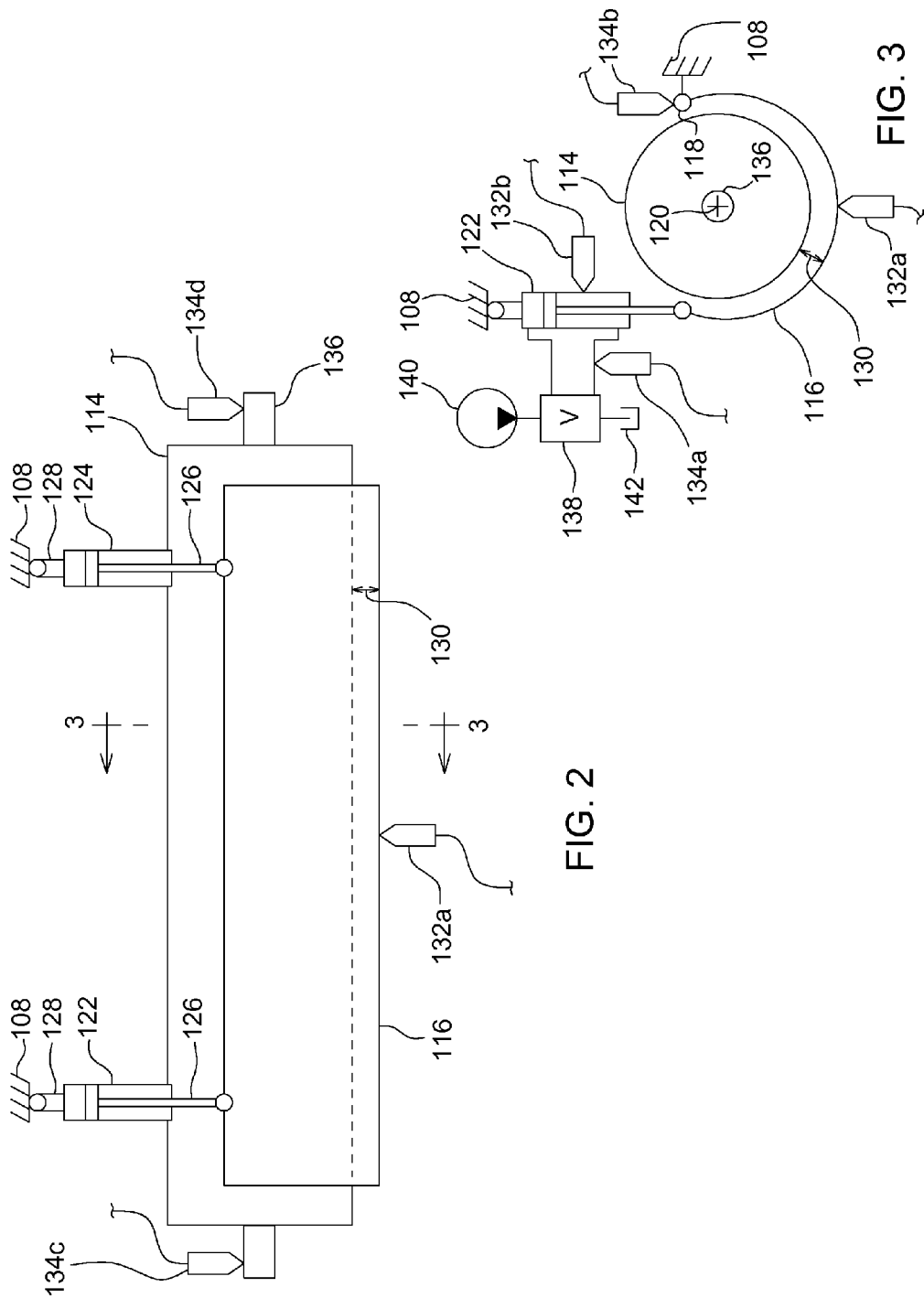

SELF ADJUSTING CONCAVE CLEARANCE SYSTEM

RELATED APPLICATIONS

There are no related applications.

FIELD OF THE INVENTION

The invention relates generally to agricultural harvesters, more particularly, control systems for agricultural harvesters configured to control the rotor/concave spacing and force.

BACKGROUND OF THE INVENTION

Agricultural harvesters are configured to sever crop plants from the ground, then to separate the grain portion of the crop plant from the other portions of the crop plant. The other portions of the crop plant are known as "MOG" (material other than grain).

One common way of performing this separation is to insert the cut crop material between a rotating cylinder (commonly called a "rotor") and a stationary concave structure (commonly called a "basket" or "concave". The rotor and the concave abut a layer of cut crop material that is inserted between them, and the relative motion between the two causes the grain portion to be broken loose (i.e. threshed) from the other portion of the crop plant.

Once threshed, the grain falls through apertures in the concave for further processing, and is ultimately saved in a grain tank (commonly called a "grain reservoir") for later unloading from the combine.

The speed of the rotor with respect to the concave and the gap between the rotor and the concave, and the force applied to the cut crop material disposed between the rotor and the concave affect the amount of grain harvested and quality of the grain.

If the relative speed is too high, or the gap is too small, or the force applied to the cut crop material too high, the seeds can be damaged, and therefore the price the farmer can get for his grain in the marketplace. This is not economic.

If the relative speed is too low, or the gap too great, or the force too small, much of the grain may not be threshed and may be carried with the MOG and deposited on the ground. This reduces the yield of grain from a particular portion of the field and therefore reduces the amount of money the farmer makes. This is not economic.

Controlling the force applied to the grain compress between the rotor and the concave, and controlling the thickness of the crop mat (i.e. the gap between the rotor and the concave) are important to achieving the highest production possible from the combine.

One unfamiliar with modern agriculture would think that finding an optimum force and an optimum gap would be all that is required. This is not correct, however. Combines typically operate at a constant speed as they travel through the field harvesting crop. The crop, however, varies considerably. In some portions of the field the crop may be quite thin. In other portions of the field the crop may be quite thick. As a result, the amount of crop that is inserted between the rotor and the concave during harvesting can vary considerably.

The gap between the rotor and the concave should preferably change during harvesting to accommodate a thick or a thin crop mat between the rotor and the concave thereby accommodating the varying volumes of crop in different regions of an agricultural field.

Likewise, different crops require different rotor/concave gaps. Corn kernels, for example, are carried on a cob that is approximately 2 cm in diameter. In order to thresh ears of corn, a relatively wide gap is typically provided between the rotor and the concave. Soybeans, in contrast, are attached to stems, not cobs. They are typically provided a smaller gap (as compared to corn) to properly thresh the soybeans. Other crops have different optimum rotor/concave spacings.

Another difference between crops is the durability of the seed itself. Corn kernels may have a relatively thick, hard outer layer, and therefore may be able to withstand significant pressure without being damaged. Soybeans, may be more easily damaged and thus make tolerate less pressure without being damaged. Wheat, a long slender grain, may tolerate even less pressure without being damaged.

Thus, one rotor/concave spacing (i.e. one gap between the rotor and the concave) is not economically optimal for harvesting all crops under all harvesting conditions. Similarly, one amount of pressure applied to the crop mat is also not economically optimal for harvesting all crops under all harvesting conditions.

For this reason, modern combines permit the operator to set the pressure applied to the crop mat passing between the rotor and the concave as well as the thickness of the crop mat (i.e. the spacing between the rotor and the concave).

In several prior art arrangement (e.g. U.S. Pat. No. 3,974,837, GB1379808, EP0092599) a concave is biased against the rotor by springs.

In another prior art arrangement (U.S. Pat. No. 7,857,690) a controller maintains a constant set pressure in a hydraulic concave support system from a minimum separation distance to a maximum separation distance.

What is needed is an arrangement for controlling the force and gap between a rotor and a concave that is more responsive to different crop conditions and crops. It is an object of this invention to provide such a system.

SUMMARY OF THE INVENTION

In accordance with a first aspect of the invention, an agricultural combine is provided that comprises a rotor; a concave extending about the rotor and defining a gap therebetween; at least one actuator coupled to the concave, wherein the at least one actuator is configured to change the gap when the at least one actuator is actuated; at least one force sensor configured to provide a force signal indicative of a force applied by the rotor and the concave to a crop mat disposed in the gap; at least one position sensor configured to provide a position signal indicative of a magnitude of the gap; an ECU coupled to the at least one actuator, to the at least one force sensor and to the at least one position sensor, wherein the ECU contains at least one economic operating curve that correlates a force applied to the crop mat and a magnitude of the gap, wherein the ECU is configured to read the force signal and the position signal, wherein the ECU is configured to actuate the at least one actuator to drive the force signal and the position signal to a point on the at least one economic operating curve.

The agricultural combine may further comprise an operator input device that is configured to generate an operator signal made by an operator of the agricultural combine, the operator signal may indicate a desired economic operating curve, the operator input device may be coupled to the ECU, the ECU may be configured to receive the operator signal, and the ECU may be configured to select the at least one economic operating curve based at least upon the operator signal.

The ECU may comprise an ALU and at least one digital memory circuit, and the at least one digital memory circuit may store the at least one operating curve as at least one digital value.

The at least one digital memory circuit may store at least two operating curves, the at least two operating curves may be individually selectable by an operator of the agricultural combine using an operator input device.

The at least one actuator may be a hydraulic cylinder.

The at least one force sensor may be disposed to sense hydraulic fluid pressure in the at least one actuator.

The at least one force sensor may be disposed to sense a mechanical load on the concave.

The concave may be supported for pivotal movement about a hinge, and the at least one force sensor may be disposed at the hinge.

BRIEF DESCRIPTION OF THE DRAWINGS

FIG. 2 is a fragmentary view of the combine of FIG. 1 showing details of the rotor and the concave.

FIG. 3 is a cross-section of the arrangement of FIG. 2 taken at section line 3-3 in FIG. 2.

DETAILED DESCRIPTION

Figure 1:
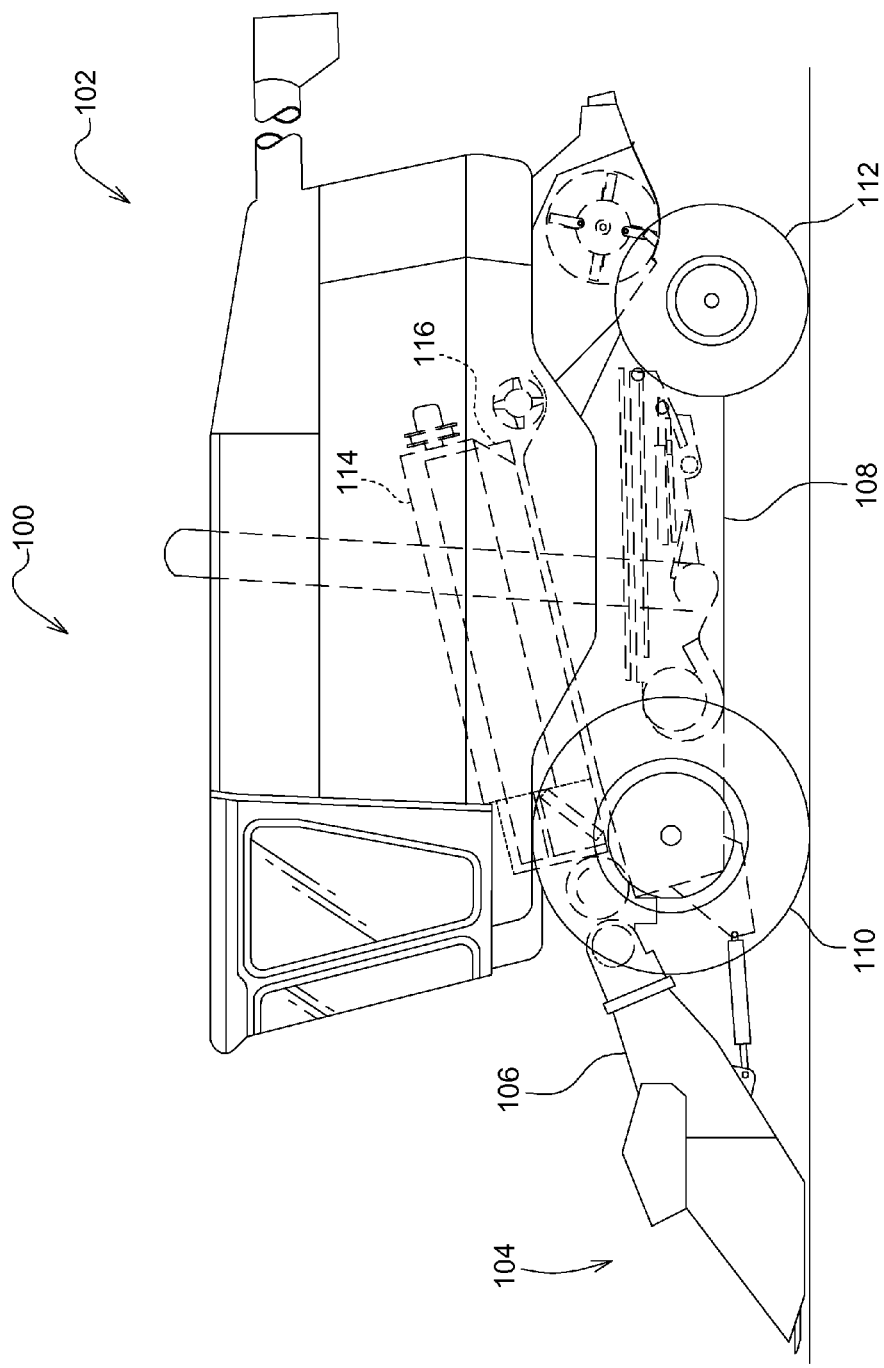
FIG. 1 illustrates a side view of an agricultural harvester in accordance with the present invention.

In FIGS. 1, 2, and 3, an agricultural harvester 100 comprises an agricultural combine 102 and an agricultural harvesting head 104. The agricultural harvesting head 104 is supported on a feederhouse 106 which is pivotally supported to the front of the agricultural combine 102. Hydraulic cylinders (not shown) raise and lower the agricultural harvesting head 104 with respect to the ground.

The agricultural combine 102 comprises a chassis 108 which is supported for movement over the ground on driven front wheels 110 and steerable rear wheels 112. The chassis 108 supports the feederhouse 106 as well as a rotor 114 and a concave 116.

The rotor 114 is an elongate cylindrical member with protrusions (not shown) extending from its outer surface to help convey the cut crop material through the gap between the rotor 114 and the concave 116. The concave 116 is an elongate arcuate member that wraps around the lower surface of the rotor 114 and defines a gap therebetween. It is into this gap that cut crop material from the agricultural harvesting head 104 is introduced for threshing and separating.

The concave 116 is supported on a hinge 118 on one side of the concave 116. The hinge 118 permits the concave 116 to pivot both toward and away from the rotor 114, thereby changing the size of the gap between the rotor 114 and the concave 116. The hinge 118 extends generally parallel to the rotational axis 120 of the rotor 114 and constrains the concave to rotate about the hinge 118.

The concave 116 is supported by an actuator 122 and an actuator 124 on the other side of the concave 116. The actuator 122 and the actuator 124 are illustrated herein as hydraulic cylinders that are coupled at a lower end 126 to the concave 116, and are coupled at an upper end 128 to the chassis 108. In this manner, as the actuator 122 in the actuator 124 extend and retract, they cause the concave 116 to rotate counterclockwise and clockwise about the hinge 118, thereby causing a gap 130 between the outer surface of the rotor 114 in the inner surface of the concave 116 to become wider and narrower, respectively.

A position sensor 132 is configured to generate a signal indicative of the width of the gap 130. The position sensor 132 may be coupled directly to the concave 116 (for example, sensor 132a). It may be coupled to a remote structure (for example, sensor 132b coupled to cylinder 122) to indirectly provide a signal indicative of the gap 130. These are just some of the ways a sensor can be disposed to sense the width of the gap 130. Given the almost infinite number of ways in which a concave can be designed and supported, an exhaustive list of potential locations, configurations and arrangements cannot be provided herein.

A force sensor 134 is configured to generate a signal indicative of the force applied to the cut crop material. The force sensor 134 can be configured in a variety of ways. As one example, it may be a force sensor 134a disposed to sense the hydraulic fluid pressure in the actuator 122 or the actuator 124. As another example, it may be a hinge pin for hinge 118 instrumented with strain gauges to provide a signal indicative of the shear load on the hinge pin, which is indicative of the force applied to the cut crop material. It may be a strain gauge 134c or of strain gauge 134d coupled to a bearing supporting the driveshaft 136 of the rotor 114 to sense the upward force of the cut crop material disposed in the gap 130 that is applied against the lower portion of the rotor 114. These are just some of the ways a sensor can be disposed to sense the force applied to the cut crop material. Given the almost infinite number of ways in which the force applied to the cut crop material, an exhaustive list of potential locations, configurations and arrangements cannot be provided herein.

A valve arrangement 138 is coupled to the actuator 122 and the actuator 124 to control the position of the concave 116 with respect to the rotor 114. The valve arrangement 138 controls the flow of hydraulic fluid to and from the actuator 122 and the actuator 124 from a source 140 of pressurized hydraulic fluid and to a hydraulic fluid tank 142.

Figure 4:
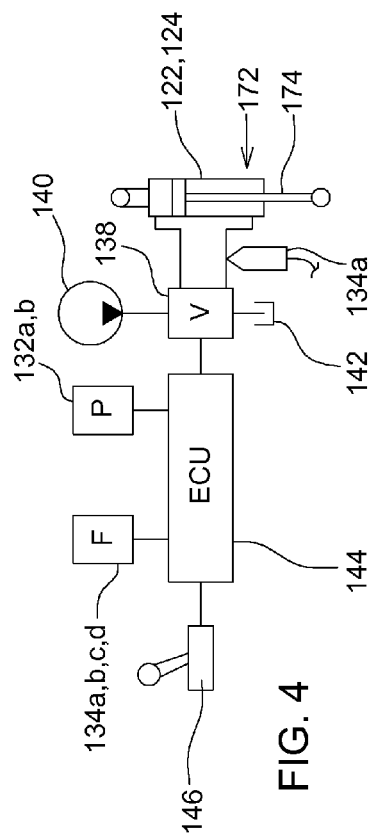
FIG. 4 is a schematic diagram of a control system for controlling the spacing of the rotor and the concave and the force applied to the crop mat disposed between the rotor and the concave.

Referring to FIG. 4, an electronic control unit (ECU) 144 is provided that is coupled to an operator input device 146, the position sensor 132, the force sensor 134, and the valve arrangement 138. The ECU 144 comprises an arithmetic logic unit (ALU) and a memory circuit. The memory circuit is configured to store digital instructions that are executed by the ALU and digital data processed by the ALU during the operation of the ECU. The ECU 144 may also include driver circuits configured to drive the valve arrangement 138, and signal conditioning circuits configured to receive the signals from the position sensor (or sensors) 132 and the force sensor (or sensors) 134.

The ECU 144 is configured by the digital instructions stored in the memory circuit to receive signals from the position sensor 132, the force sensor 134, and to generate a signal that drives the valve arrangement 138 based at least upon the signals received from the position sensor (or sensors) 132 and the force sensor (or sensors) 134.

The operator input device 146 is coupled to the ECU 144 to send the ECU 144 signals indicating operator commands. The operator input device may comprise any device or devices coupleable to the ECU 144 to transmit commands, for example a knob, dial, rheostat, potentiometer, shaft encoder, lever, quadrant lever, switch, voice recognition system, and touchscreen.

Figure 5:
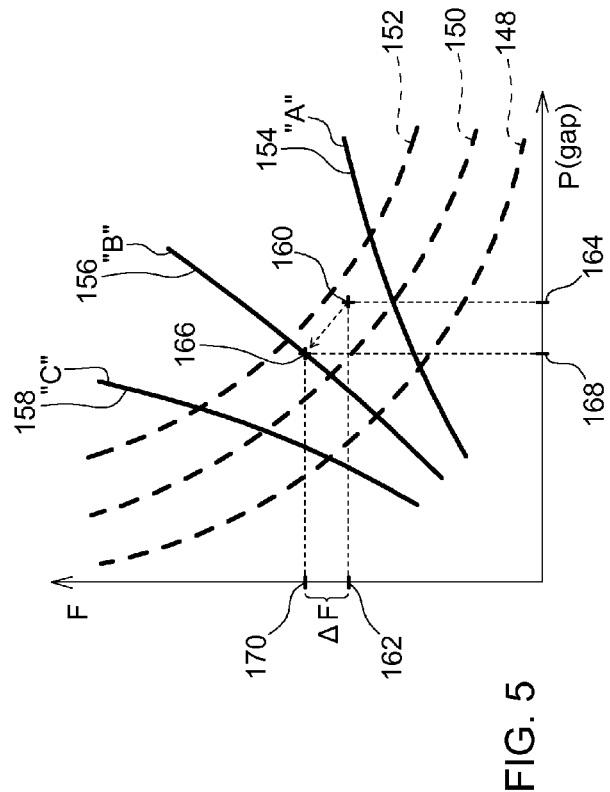
FIG. 5 is a graph illustrating the relationship between the force applied to the crop mat between the rotor and the concave, and the gap (i.e. the spacing) between the rotor and the concave.

FIG. 5 illustrates several rotor/concave force versus position operating curves for the agricultural harvester 100. Curve 148, curve 150, and curve 152 are force versus position operating curves. For any thickness of crop mat between the rotor 114 and the concave 116, and increase in force applied to the crop mat (i.e. by increasing the hydraulic fluid pressure in the actuator 122 and the actuator 124) will cause the crop mat to become increasingly compressed. The gap will get smaller as the pressure increases. For a thin crop mat, the force (i.e. the pressure on the crop mat) versus position (i.e. the rotor/concave gap) relationship will follow curve 148. For a medium thickness crop mat, the force versus position relationship will follow curve 150. For a second crop mat, the force versus position relationship will follow curve 152. To illustrate this relationship between force (i.e. the pressure on the crop mat) and position (i.e. the rotor/concave gap) three curves have been provided in FIG. 5. It should be clear, however, that the thickness of the crop mat can vary widely and therefore there are an infinite number of operating curves for different crop thicknesses (other than the three illustrated herein) that are generally parallel to the operating curves 148, 150, 152.

FIG. 5 also illustrates three economic operating curves, including an economic operating curve 154 for crop "A", an economic operating curve 156 for crop "B", and an economic operating curve 158 for crop "C". It is been determined experimentally, that any of several crops harvested by the agricultural harvester 100 can be harvested more economically (e.g. less grain breakage, and more grain production) by following an operating curve such as economic operating curve 154, economic operating curve 156, and economic operating curve 158 that is specific to a particular crop. Generally speaking, as the crop mat thickness increases, additional force (and therefore pressure) can and should be applied to the crop mat between the rotor 114 and the concave 116. The rate at which the pressure increases as the thickness of the crop mat increases will vary from crop to crop.

The ECU 144 is programmed to periodically read the position signal provided by the position sensor 132 (e.g. 132, 132a, or 132b depending upon the arrangement) and the force signal provided by the force sensor 134 (e.g. 134, 134a, 134b, 134c, 134d, depending upon the arrangement).

After reading the position signal and the force signal, the ECU 144 is programmed to compare the value of the force signal and the position signal with the economic operating curve for the crop being harvested (for the stake of illustration we will assume that the crop being harvested is crop "B", and therefore the economic operating curve is 156).

If the ECU 144 determines that the current operating point (e.g. point 160, which equals the current force 162 indicated by the force signal and the current position 164 indicated by the position signal) does not fall upon the economic operating curve (e.g. 156) as shown in FIG. 5, then the ECU 144 is configured to automatically calculate an appropriate change in force (ΔF) that will move the rotor and concave from the current operating point 160 to an operating point 166 on the economic operating curve 156. Thus, as the thickness of the crop mat changes during harvesting, and the operating point of the rotor/concave pair shifts away from the economic operating curve, the ECU 144 periodically calculates a new force to be applied to the crop mat and a new crop mat thickness that will return the rotor/concave pair to the economic operating curve.

Having calculated the appropriate change in force (ΔF) that will return the rotor/concave pair to an operating point (e.g. point 166) on the economic operating curve 156, the ECU 144 is configured to change the signal applied to the valve arrangement 138 such that it produces a force 170 (indicated by the force sensor 134 (e.g. 134a or 134b)) corresponding to the operating point 166.

If the force that the ECU 144 has calculated (e.g. force 170) is greater than the current force (e.g. force 162), then the ECU signals the valve arrangement 138 to apply more tension to the actuator 122 and the actuator 124 and increases the hydraulic fluid pressure in the rod end 172 of the actuator 122 and the actuator 124. This in turn increases the force applied by the piston rod 174 to the concave 116 thereby causing it to rotate clockwise (in FIG. 3) about the hinge 118, thereby reducing the gap 130 until the gap reaches the position 168 (see FIG. 4). The opposite operation would be performed if the force that the ECU 144 has calculated is less than the current force.

If, on the other hand, the ECU 144 determines that the current operating point falls upon the economic operating curve 156, then the operation of the rotor/concave pair is deemed to be "economic" and the ECU 144 does not change the force applied to the concave 116.

As crop harvesting continues, the thickness of the crop mat will vary. When this happens, the force indicated by the force sensor and the gap between the rotor in the concave which is indicated by the position sensor will change away from an operating point on the economic operating curve to appoint away from the economic operating curve. However, since the steps described above by the ECU 144 are repeatedly executed during normal harvesting operations, this new operating point would be detected by the ECU 144 and a new correction can be made to move operation of the rotor and concave back to a point on the economic operating curve. Thus, the ECU 144 repeatedly and continuously changes the operating point of the rotor and concave during normal field operations, keeping the operation on the economic operating curve selected by the operator.

In the example shown in FIG. 4, three economic operating curves 154, 156, and 158 were illustrated. Each one of these, as described above, corresponded to a different crop. There may be more (or fewer) economic operating curves. Furthermore, while the economic operating curves may be based upon and/or derived from the type of crop (e.g. wheat, corn, right, soybeans, etc.) as illustrated above, they may be based upon and/or derived from other characteristics that contribute to economic harvesting such as the crop moisture content (e.g. moisture content of the grain), the crop condition (e.g. whether the harvested crop is "downed" crop or standing crop), the crop economics (e.g. the market price of the grain being harvested and/or the market price of damaged grain being harvested), the fuel costs (e.g. the cost of fuel used to run the agricultural harvester 100), the labor costs (e.g. the cost of operators or mechanics for the agricultural harvester 100), and the configuration of the vehicle (the size, the model, the dimensions or the operating parameters of the agricultural harvesting head 104 attached to the front of the agricultural combine 102).

The operator input device 146 is configured to generate a signal (in response to operator manipulation) that is transmitted to the ECU 144. The ECU, in turn, is configured to receive that signal and use it to select the appropriate economic operating curve. The operator can, for example (and using the arrangement illustrated in FIG. 5), operate the operator input device 146 to select any of crop "A", crop "B", or crop "C". The ECU 144 is configured to receive this signal from the operator input device 146, and to subsequently use the corresponding economic operating curve 154, 156 and 158 in all the ECU's subsequent calculations to determine an economic operating point (e.g. point 166 in FIG. 5) along the selected economic operating curve.

The economic operating curves 154, 156, 158 themselves are stored in the memory circuits of the ECU 144 as digital values in a data structure. The economic operating curves are selectable by the ECU 144 based upon the selection made by the operator using the operator input device 146. The form in which the economic operating curves are stored can vary. They can be stored as equations, parameters of equations, points, tables, curves, lines, piecewise linearizations, arrays, or other forms of two-dimensional data storage that correlate a value indicative of force (i.e. the force or pressure applied to the crop mat between the rotor and the concave) with a value indicative of position (i.e. the width of the gap between the rotor and concave). Each economic operating curve can be considered a set of operating points, each of which points constitute a pair of values, with one value indicating a force acting on the crop mat and with the other value indicating a size of the gap between the rotor and the concave.

The examples illustrated and described above are not the only way the invention may be created and operated. The invention is defined in the claims that follow. The examples above serve to illustrate the claims and bring them meaning and life. Other arrangements that fall within the scope of the claims below are also considered part of the invention.

For example, the description above described a single ECU 144 coupled to several other devices and configured to perform a series of operations defined by digital instructions stored in a memory circuit of the ECU 144. In another arrangement, the ECU 144 may comprise a plurality of ECUs 144, wherein ECU of the plurality of ECUs 144 may perform one or more of the operations described above, and wherein the plurality of ECUs 144 collectively perform the operations described above. This plurality of ECUs 144 may be connected together to communicate with each other and share information using a wired or wireless network, such as a CAN, LAN or WAN network. The network may communicate using serial or parallel information transfer.

The description above describes the ECU 144 performing operations peculiar to this invention. The ECU 144 (or the plurality of ECUs 144) can (and probably will) be programmed to perform a variety of other operations as well.

The description above indicates that the operator input device 146 performs operations peculiar to this invention. The operator input device 146 may also be configured to provide a variety of other operator inputs for other operations as well.

The description above indicates that the force sensor 134 provides a signal that indicates the force applied to the crop mat disposed in the gap 130. This signal also indicates the pressure applied to the crop mat disposed in the gap 130, and hence the force sensor 134 is also a pressure sensor.

We claim:

1. An agricultural combine comprising:
a rotor; a concave extending about the rotor and defining a gap therebetween;
at least one actuator coupled to the concave, wherein the at least one actuator is configured to change the gap when said at least one actuator is actuated;
at least one force sensor configured to provide a force signal indicative of a force applied by the rotor and the concave to a crop mat disposed in the gap;
at least one position sensor configured to provide a position signal indicative of a magnitude of the gap; an electronic control unit (ECU) coupled to the at least one actuator, to the at least one force sensor and to the at least one position sensor, wherein the ECU contains at least one economic operating curve that correlates a single force value applied to the crop mat with a single magnitude of the gap, wherein the ECU is configured to read the force signal and the position signal, wherein the ECU is configured to actuate the at least one actuator to drive the force signal and the position signal to a point on the at least one economic operating curve.

2. The agricultural combine of claim 1, further comprising:
an operator input device configured to generate an operator signal made by an operator of the agricultural combine, wherein the operator signal is indicative of a desired economic operating curve, wherein the operator input device is coupled to the ECU and further wherein the ECU is configured to receive the operator signal and wherein the ECU through that is configured to select the at least one economic operating curve based at least upon the operator signal.

3. The agricultural combine of claim 1, wherein the ECU comprises an arithmetic logic unit (ALU) and at least one digital memory circuit, and further wherein the at least one digital memory circuit contains the at least one economic operating curve as at least one digital value.

4. The agricultural combine of claim 3, wherein the at least one digital memory circuit contains at least two operating curves, and further wherein the at least two operating curves are individually selectable by an operator of the agricultural combine using an operator input device.

5. The agricultural combine of claim 1, wherein the at least one actuator is a hydraulic cylinder.

6. The agricultural combine of claim 5, wherein the at least one force sensor is disposed to sense hydraulic fluid pressure in the at least one actuator.

7. The agricultural combine of claim 1, wherein the at least one force sensor is disposed to sense a mechanical load on the concave.

8. The agricultural combine of claim 7, wherein the concave is supported for pivotal movement about a hinge, and further wherein the at least one force sensor is disposed at the hinge.

9. The agricultural combine of claim 1, wherein the ECU is coupled to the at least one actuator by a valve arrangement, and further wherein the valve arrangement is configured to control the flow of hydraulic fluid to and from the at least one actuator under control of the ECU.

* * * * *